United States Patent
Chang et al.

[11] Patent Number: 6,107,574
[45] Date of Patent: *Aug. 22, 2000

[54] SEALING ARTICLE

[76] Inventors: Rong J. Chang, 804 Beaver Ct., Fremont, Calif. 94538; Keith Dawes, 520 Warren Rd., San Mateo, Calif. 94402

[*] Notice: This patent is subject to a terminal disclaimer.

[21] Appl. No.: 09/028,850

[22] Filed: Feb. 24, 1998

[51] Int. Cl.⁷ .................................................. H02G 15/04
[52] U.S. Cl. ........................................................ 174/77 R
[58] Field of Search ................................ 174/77 R, 65 G, 174/153 G, 113 C, 131 A, DIG. 8; 277/316, 603

[56] References Cited

U.S. PATENT DOCUMENTS

| | | | |
|---|---|---|---|
| 4,179,319 | 12/1979 | Lofdahl et al. | 156/86 |
| 4,278,738 | 7/1981 | Brax et al. | 428/515 |
| 4,438,294 | 3/1984 | Meltsch et al. | 174/88 R |
| 4,600,268 | 7/1986 | Spicer | 174/113 C X |
| 4,647,716 | 3/1987 | Akiyama et al. | 174/77 R |
| 4,654,473 | 3/1987 | Roux et al. | 174/77 R X |
| 4,666,164 | 5/1987 | Becker et al. | 277/22 |
| 4,790,544 | 12/1988 | Kemp | 277/34 |
| 4,797,513 | 1/1989 | Ono et al. | 174/153 G |
| 4,896,904 | 1/1990 | Gadsen et al. | 285/381 |
| 4,940,179 | 7/1990 | Soni | 174/DIG. 8 X |
| 4,963,698 | 10/1990 | Chang et al. | 174/77 R |
| 4,972,042 | 11/1990 | Seabourne et al. | 174/23 R |
| 5,006,187 | 4/1991 | Cook et al. | 156/244.11 |
| 5,244,408 | 9/1993 | Muller et al. | 439/460 |
| 5,298,300 | 3/1994 | Hosoi et al. | 174/DIG. 8 X |
| 5,378,879 | 1/1995 | Monovoukas | 219/634 |
| 5,529,508 | 6/1996 | Chiotis et al. | 439/204 |
| 5,562,295 | 10/1996 | Wambeke et al. | 277/34 |
| 5,588,856 | 12/1996 | Collins et al. | 439/204 |
| 5,626,486 | 5/1997 | Shelly et al. | 439/281 |
| 5,931,474 | 8/1999 | Chang et al. | 277/316 |

FOREIGN PATENT DOCUMENTS

| | | | |
|---|---|---|---|
| 0061929 | 10/1982 | European Pat. Off. | B65D 53/04 |
| 0574862 | 12/1983 | European Pat. Off. | H01R 13/52 |
| WO 92/10355 | 6/1992 | WIPO | B29C 61/00 |

OTHER PUBLICATIONS

Hawley, "the Condensed Chemical Dictionary", p. 287, 1981.

PCT International Search Report for International Application No. PCT/US99/03932.

*Primary Examiner*—Kristine Kincaid
*Assistant Examiner*—Chau N. Nguyen

[57] ABSTRACT

This invention provides a planar sealing article including: (a) a driver including a crosslinked foamable polymer, and (b) a sealer including an uncrosslinked foamable polymer in intimate contact with the driver and surrounding the driver in the plane of the article, the sealer having a plurality of apertures therethrough. The sealing article is especially adapted for forming a seal between a plurality of substrates and a bounded opening through which the plurality of substrates pass.

14 Claims, 2 Drawing Sheets

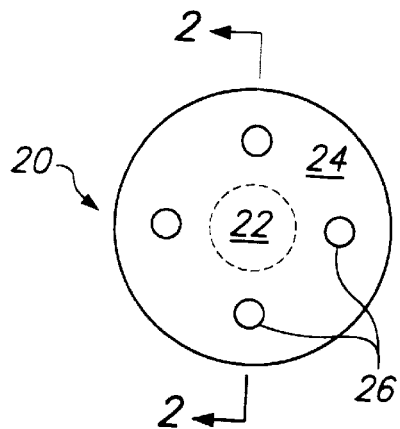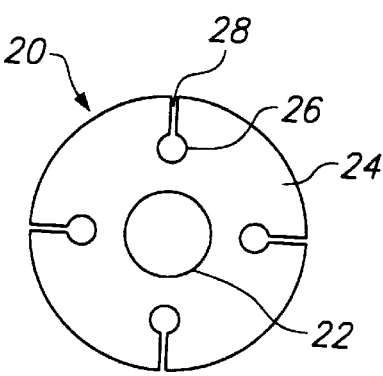
FIG. 1　　FIG. 2　　FIG. 3
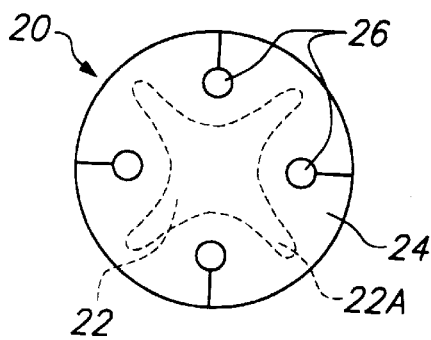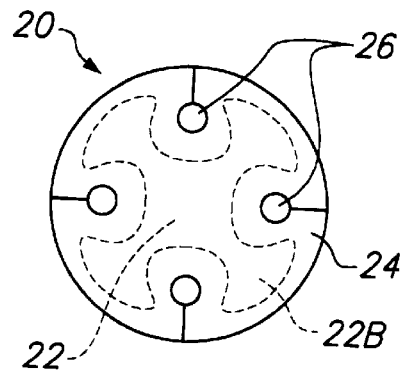
FIG. 4　　FIG. 5
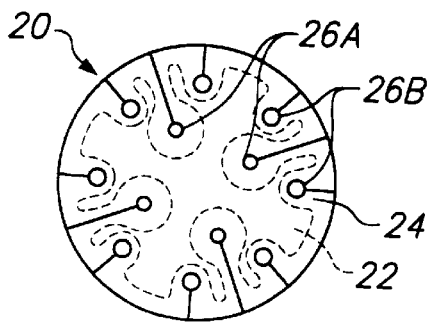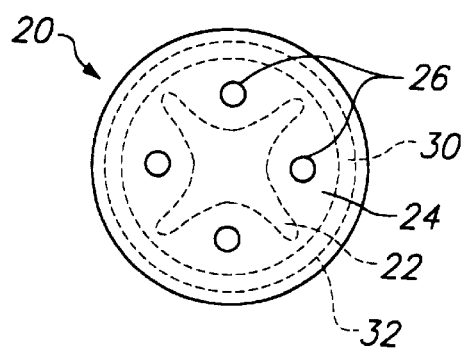
FIG. 6　　FIG. 7

SEALING ARTICLE

CROSS-REFERENCE TO RELATED APPLICATIONS

The subject matter of this application is related to the subject matter of our U.S. patent application Ser. No. 08/805,387, filed Feb. 24, 1997, and Ser. No. 08/925,422, filed Sep. 8, 1997 now abandoned (which is itself a continuation-in-part of application Ser. No. 08/805,387), and Ser. No. 09/028,122, filed Feb. 23, 1998 now U.S. Pat. No. 5,931,474, which is itself a continuation-in-part of application Ser. Nos. 08/805,387 and 08/925,422). These three applications are incorporated herein by reference in their entirety.

BACKGROUND OF THE INVENTION

This invention relates to sealing articles, and methods for making and using them. More particularly, this invention relates to sealing articles for forming a seal between a plurality of substrates and a bounded opening through which the plurality of substrates passes. In a particular aspect, this invention relates to articles and methods for forming a seal between a plurality of electrical conductors and a bounded opening, such as a tube, a connector backshell, a grommet, an opening in a firewall or other barrier, or a heat-shrinkable sleeve, through which the conductors pass; and the invention will be discussed primarily with respect to that aspect.

Forming an environmental seal between a substrate, such as an electrical conductor, optical fiber, and the like, and an opening through which it passes is a frequently encountered problem to which may solutions are known. The sealing problem becomes more difficult when the gap between the substrate and the opening is large and/or when two or more substrates pass through the same opening. Much difficulty is encountered with a plurality of substrates because all of the gaps between each of the substrates and between the substrates and the boundary of the opening must be sealed.

Lofdahl, U.S. Pat. No. 4,179,319, discloses a laminated sealing article comprising a layer of adhesive sandwiched between a pair of crosslinked, dimensionally heat unstable wafers of polymeric material. The article is provided with a plurality of apertures designed to receive a plurality of substrates therethrough; and the gaps between the plurality of substrates are sealed by heating the article to the recovery temperature of the wafers.

Meltsch et al., U.S. Pat. No. 4,438,294, discloses a sealing element for a cable entrance socket of a cable sleeve, where the element is made of a crosslinked thermoplastic material that is shrinkable to a previous shape when subjected to a shrinking process.

Akiyama et al., U.S. Pat. No. 4,647,716, discloses an article comprising a tubular outer member and a heat expandable compressed pre-foamed sealing member. When substrates, such as wires or wire bundles, are inserted in the tubular outer member and the article is heated, the sealing member expands to fill the space between the substrates and the tubular outer member.

Becker et al., U.S. Pat. No. 4,666,164, discloses a laminated sealing article comprising an adhesive layer, a heater layer, and a heat-recoverable foam layer, the thickness of which increases on heating. The article may be used to seal cable ducts and the like; where, on energizing the heater, the foam increases in thickness and forces the adhesive into sealing engagement between the duct wall and a cable.

Ono et al., U.S. Pat. No. 4,797,513, discloses a sealed funnel-shaped grommet for carrying a wire bundle or cable through a panel, where a sealing material, such as a two-part polyurethane resin, is put into the grommet from above to fill the space between a narrow cylindrical portion of the grommet and the wire bundle and gaps between wires.

Muller et al., U.S. Pat. No. 5,244,408, discloses a terminal housing with a wire entry system in which two closed-cell foam pads are mounted at each wire entrance port to provide strain relief and sealing around the wires.

The disclosures of these and other documents referred to throughout the specification of this application are incorporated herein by reference in their entirety.

It would be desirable to produce a sealing article, especially a sealing article for forming a seal between a plurality of substrates and a bounded opening through which the plurality of substrates passes, that could be prepared readily and inexpensively, would be readily usable, and would provide an effective seal between the plurality of substrates and the bounded opening when used.

BRIEF SUMMARY OF THE INVENTION

In a first aspect, this invention provides a planar sealing article comprising:
(a) a driver comprising a crosslinked foamable polymer, and
(b) a sealer comprising an uncrosslinked foamable polymer in intimate contact with the driver and surrounding the driver in the plane of the article, the sealer having a plurality of apertures therethrough.

In particular, in this first aspect, this invention provides a planar sealing article for forming a seal between a plurality of substrates and a bounded opening through which the plurality of substrates pass, the article comprising:
(a) a driver comprising a crosslinked foamable polymer, and
(b) a sealer comprising an uncrosslinked foamable polymer in intimate contact with the driver and surrounding the driver in the plane of the article, the sealer having a plurality of apertures therethrough;
the article having a size and shape such that the article incompletely occupies the bounded opening and having expansion and sealing properties such that, when the article is placed within the bounded opening and the plurality of substrates are placed through the plurality of apertures, and the article is activated, a seal is formed between the plurality of substrates and the bounded opening.

In a second aspect, this invention provides a method of forming a seal between a plurality of substrates and a bounded opening through which the plurality of substrates pass by use of the sealing article of the invention.

In a third aspect, this invention provides a method of making the sealing article of the invention.

BRIEF DESCRIPTION OF THE DRAWINGS

FIG. 1 is a top view, i.e. a view perpendicular to the plane of the article, of a first embodiment of the sealing article of this invention.

FIG. 2 is a side cross-sectional view of the article of FIG. 1, as viewed through lines 2—2 of FIG. 1.

FIG. 3 is a top view of a second embodiment of the sealing article of this invention, showing the apertures connected by slots to the periphery of the article, illustrating how the article can be installed on existing substrates without having access to the substrates' ends.

FIG. 4 is a top view of a third embodiment of the sealing article of this invention, showing a toothed driver designed to ensure separation of the substrates.

FIG. 5 is a top view of a fourth embodiment of the sealing article of this invention, showing a toothed driver substantially surrounding the apertures.

FIG. 6 is a top view of a fifth embodiment of the sealing article of this invention, showing two concentric rings of apertures.

FIG. 7 is a top view of a sixth embodiment of the sealing article of this invention, showing a second driver surrounding the apertures.

DETAILED DESCRIPTION OF THE PREFERRED EMBODIMENTS

Figure 8:
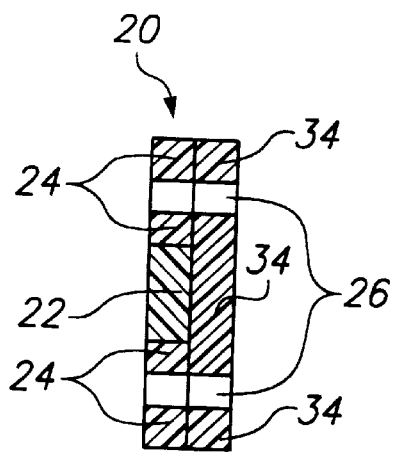
FIG. 8 is a side cross-sectional view, similar to FIG. 2, of a seventh embodiment of this invention in which the sealing article comprises a second layer of sealer.
Figure 9:
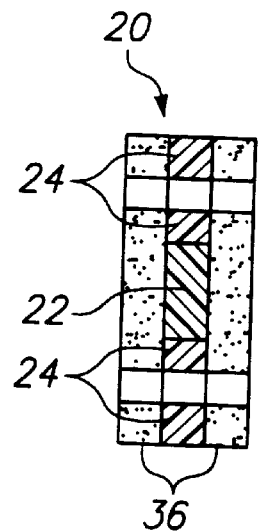
FIG. 9 is a side cross-sectional view, similar to FIG. 2, of an eighth embodiment of this invention in which the sealing article comprises two layers of adhesive sandwiching the driver and sealer.
Figure 10:
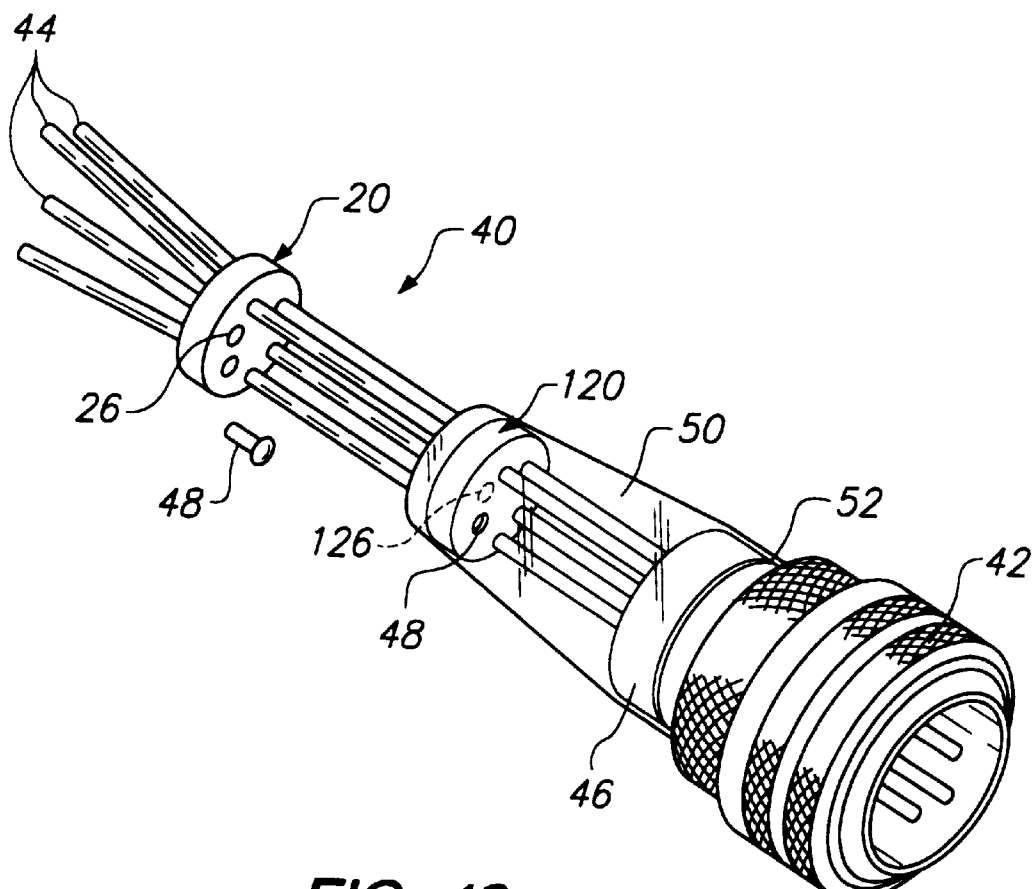
FIG. 10 is a perspective view of a sealing article of this invention shown in combination with a heat shrinkable sleeve to seal the rear of an electrical connector.

Referring to the drawings, where like numerals denote like elements of the invention, FIG. 1 is a top view showing a first embodiment of the sealing article of this invention. The sealing article 20 comprises a disc of foamable polymeric material of which a portion 22 has been crosslinked to form the driver of the article and a portion 24 remains uncrosslinked to form the sealer of the article. Apertures 26 have been opened in the sealer from top to bottom, i.e. generally perpendicular to the plane of the article, to permit the passage of substrates therethrough. For simplicity, only four apertures have been shown, though it will readily be understood that the number of apertures may be substantially higher; and a twelve-aperture sealing article is shown in FIG. 6 discussed later. In FIG. 1, and also in FIGS. 4 through 7 discussed later, the driver 22 and sealer 24 have been shown as formed from a single piece of foamable polymeric material. Also, in FIG. 1, the apertures 26 are shown as being unconnected to the periphery of the article 20, so that any substrates to be sealed by the sealing article must have a free end to pass through the apertures. FIG. 2 is a side cross-sectional view of the sealing article of FIG. 1, as viewed through lines 2—2 of FIG. 1. This view clearly shows the apertures 26 opened through the sealer 24. FIG. 3 is a top view showing a second embodiment of the sealing article of this invention. In this embodiment, the driver 22 and sealer 24 have been shown as being formed from separate pieces of foamable polymeric material. Also, in FIG. 3, the apertures 26 are shown as being connected to the periphery of the article 20 by slots 28, so that any substrates to be sealed by the sealing article need not have a free end available to pass through the apertures. FIG. 4 is a top view showing a third embodiment of the sealing article of this invention, in which the driver 22 is toothed with teeth 22A so that a portion of the driver lies between any two apertures 26, i.e. so that a line connecting any two apertures passes through the driver. The apertures 26 are shown as being connected to the periphery of the article by slits. FIG. 5 is a top view showing a fourth embodiment of the sealing article of this invention, in which the driver 22 is toothed with broad-headed teeth 22B so that the apertures 26 are substantially surrounded by driver material. FIG. 6 is a top view of a fifth embodiment of the sealing article of this invention, showing two concentric rings of apertures, with apertures 26A in the inner ring and apertures 26B in the outer ring. In this manner, the number of apertures in the sealer 24 of the sealing article may be increased substantially over that available if only a single ring of apertures is used. FIG. 7 is a top view of a sixth embodiment of the sealing article of this invention, showing a second, outer, driver 30 surrounding the apertures and a second, outer, sealer 32 surrounding the second driver 30. A configuration such as shown in FIG. 7 offers the additional feature of the use of the second driver to provide additional expansion capability to fill large openings. FIG. 8 is a side cross-sectional view, similar to FIG. 2, of a seventh embodiment of this invention in which the sealing article 20 comprises a second layer of sealer 34 in addition to the sealer 24 surrounding driver 22 in the plane of the article. FIG. 9 is a side cross-sectional view, similar to FIG. 2, of an eighth embodiment of this invention in which the sealing article comprises two layers of adhesive 36 sandwiching the driver and sealer. Embodiments such as those shown in FIGS. 8 and 9 offer additional sealing capabilities beyond those of the articles shown in FIGS. 1 through 7. FIG. 10 is a perspective view of a sealing article of this invention shown in combination with a heat shrinkable sleeve to seal the rear of an electrical connector. A portion of a wiring harness 40 is shown in perspective. The harness includes a multiple contact electrical connector 42 having a plurality of individually insulated electrical conductors 44 extending from a tubular rear portion 46. Two articles of the invention 20 and 120 are shown positioned on the plurality of electrical conductors 44. Article 20 is shown as having six apertures 26 therethrough, although only four of the apertures are shown as having conductors 44 passing through them. If the unused apertures 26 are sufficiently small, they will be completely closed by the sealer 24 during the activation of the article, as indicated by the reference number 126 in the drawing of the activated article 120. Alternatively, if the geometry of the apertures 26 is such that they will not be sealed on activation of the article, or if it is desired to be able to insert another conductor 44 at a later time, a sealing pin 48 can be employed to fill the aperture. If it is desired that the sealing pin 48 be subsequently removable, it is preferably made from or coated with a material that the sealer 24 will not adhere strongly to, such as poly(tetrafluoroethylene). While the sealing article 20 can be used within a dimensionally stable bounded opening, such as within a pipe, it is shown in FIG. 10 as being used in conjunction with a heat-shrinkable sleeve 50 to seal the conductors 44 to the rear of the connector 42. Such heat-shrinkable sleeves are well known to the art, and may be produced by the method of Cook et al., U.S. Pat. No. 3,086,242, for example. To seal the conductors 44 to the connector 42, the conductors are positioned through corresponding apertures in the article as described above. A heat-shrinkable tubular sleeve is positioned over the tubular rear portion 46 of the connector 42 and over the periphery of the sealing article 20. The sealing article and the heat-shrinkable sleeve are heated, activating the sealing article and shrinking the sleeve, thereby causing the sealer 24 of the sealing article 20 to form a seal to the conductors 44 and the heat-shrinkable sleeve 50 forming the activated article 120 as shown; while the other end of the heat-shrinkable sleeve shrinks about the tubular rear portion 46 of the connector 42. A layer of adhesive 52 can be disposed as shown between the outer surface of the tubular rear portion 46 and an inner surface portion of the heat-shrinkable sleeve 50 as shown to ensure the integrity of the seal.

Composition of the sealing article

Suitable compositions for the sealing article of this invention will be foamable polymer compositions having a foaming temperature appropriate to the temperature range of intended application, for example a foaming temperature in the range of 60° C. to 350° C. Such compositions will contain a base polymer and a blowing agent to cause foaming of the polymer. They will typically also contain fillers, antioxidants, flame retardants, and/or other stabilizers such as are conventional in polymeric articles, and may contain pigments, plasticizers, adhesion promoters, activators for the blowing agents, and the like.

The sealer portion of the article (sometimes referred to elsewhere in this application simply as "the sealer") may, and preferably will, contain a chemical crosslinking agent to strengthen the resulting foamed polymer, and may also contain a tackifier to maximize adhesion and sealing of the article to the substrates and to the bounded opening through which the substrates pass and are to be sealed on foaming. If the sealer and the driver are not made in a unitary fashion, but are assembled before crosslinking of the driver (for example by comolding or coextrusion of the driver and sealer portions of the article), and the driver is to be crosslinked by radiation, then the sealer may contain an agent chosen to prevent radiation crosslinking (an "antirad", for example a free-radical quencher such as an amine) so that the whole article may be irradiated with only the driver being crosslinked by the radiation. The sealer is uncrosslinked before foaming, by which is meant that it is either totally free of crosslinking or has such a low degree of crosslinking that it substantially retains the foaming and adhesive characteristics of an uncrosslinked polymer. Desirably, the sealer becomes crosslinked on foaming, as discussed further later in the application, as this provides additional stability to the foam, but it is within the scope of the invention that the sealer may be uncrosslinked (as defined immediately above) even after foaming.

The driver portion of the article (sometimes referred to elsewhere in this application simply as "the driver"), which is crosslinked, will typically contain either or both of a chemical crosslinking agent and a radiation crosslinking promoter (a "pro-rad") to enhance radiation crosslinking of the driver. Where the driver portion of the article is chemically crosslinked, the crosslinking agent chosen will be one having an activation temperature substantially below the activation temperature of the blowing agent so that the driver may be crosslinked before any foaming occurs. When the driver portion of the article is radiation crosslinked, such as by exposure to electron beam irradiation, the driver portion will typically contain a radiation crosslinking promoter; the amount and type of which may be chosen depending on the polymer composition. When the driver is crosslinked by radiation, the extent of the irradiation will depend on the material of the driver (the polymer, additives, etc.), the type and quantity of radiation crosslinking promoter, the thickness of the article, etc. Typical irradiation dosages for electron beam irradiation will lie between 0.25 and 20 Mrad, preferably between 0.5 and 10 Mrad.

Although it is not required by this invention that the compositions of the foamable polymers of the driver and sealer portions of the article be the same, they should be compatible so that the resulting article provides an optimal seal when the article is used.

It may be convenient for manufacture that the compositions of the foamable polymers of the driver and sealer should be the same; and it may be further convenient that the article should be formed from a single piece of such a foamable polymeric composition. Such a manufacture is discussed further later in this application and in the Examples. In this case, the driver portion of the article will typically be crosslinked by radiation, and the foamable polymeric composition will contain both the chemical crosslinking agent for the sealer and desirably will also contain a radiation crosslinking promoter to enhance radiation crosslinking of the driver.

Suitable base polymers may include a wide range of polymers, typically chosen for a particular application so that the resulting article will foam at a convenient temperature for forming a seal between the substrates and the bounded opening through which the substrates pass and will be stable under intended use conditions. A suitable base polymer or mixture of polymers will thus have a softening point below the desired temperature of foaming in the absence of crosslinking, for example at a temperature at least 50° C. below the desired foaming temperature. The melt index (as measured by ASTM D-1238-95) of the polymer or mixture of polymers will desirably be from 0.5 to 10, preferably from 3 to 7, and in any event will desirably be chosen to give an appropriate degree of expansion of the resulting sealing article during foaming.

Suitable polymers thus include olefinic polymers such as very low density polyethylene, low density polyethylene, medium density polyethylene, high density polyethylene, polyethylenes or ethylene copolymers prepared by metallocene polymerization, such as Exact [Exxon] and Engage [Dow], ethylene copolymers such as ethylene-vinyl acetate copolymer, ethylene-methacrylic acid copolymer, ethylene-acrylic acid copolymer, ethylene-butyl acrylate copolymer, ionomers, such as Surlyn [duPont] and Iotek [Exxon], ethylene terpolymers such as ethylene-vinyl acetate-methacrylic acid copolymer, polypropylene, elastomers such as ethylene-propylene rubber, EPDM, nitrile rubbers, butyl rubbers, chloroprene, chloropolyethylene, polyacrylate elastomers, chlorosulfonated polyethylene, thermoplastic elastomers, and fluoropolymers such as polyvinylidene fluoride, ethylene-tetrafluoroethylene copolymer, fluorinated ethylene-propylene copolymer, poly (chlorotrifluoroethylene), ethylene-chlorotrifluoroethylene copolymer, etc., and mixtures of any two or more of the above.

For example, a suitable polymer or mixture of polymers for use in a sealing article for use at an activation temperature in the range of 115° C. to 250° C., say around 160° C., may have a softening point below about 100° C., preferably below 90° C., in the absence of crosslinking. Such polymers may include ethylene-vinyl acetate copolymer (EVA), ethylene-methyl acrylate copolymer (EMA), and the like, optionally admixed with each other or with such polymers as low density polyethylene and/or ionomers. An exemplary polymer is EVA having a vinyl acetate (VA) content between 5% and 45%, especially between 15 and 35%, particularly between 20% and 30%.

Suitable fillers for the composition of the sealing article include inorganic fillers such as zinc oxide, barium sulfate (Huberbrite), calcium carbonate, magnesium hydroxide, alumina trihydrate, and the like, carbon black, etc., at a concentration up to about 40 parts per 100 parts of the base polymer. If it is desired that the sealing article also provide a seal against electromagnetic interference, conductive fillers such as metal particles, conductive carbon blacks, and the like may also be used.

The blowing agent is chosen so as to effect foaming and expansion of the sealing article at the activation temperature; for example, at a temperature between 60° C. and 350° C. Suitable blowing agents will include from 1 to 15 parts per 100 parts of base polymer of an azodicarbonamide or benzenesulfonyl hydrazide. Suitable azodicarbonamide blowing agents include Celogen® AZ 130 or 3990; and suitable modified azodicarbonamide agents include Celogen® 754 or 765, all from Uniroyal Chemical. Suitable benzenesulfonyl hydrazide blowing agents include p,p'-oxybis(benzenesulfonyl hydrazide), sold as Celogen® OT, and p-toluene-sulfonyl hydrazide, sold as Celogen® TSH, both also from Uniroyal. The blowing agent may also be made up of a combination of agents depending on the degree of expansion desired for a particular application; and may also include a blowing agent activator such as diethylene glycol, urea, dinitrosopentamethylenetetramine (DNPT), and the like. Certain fillers, such as zinc oxide (Kadox), may also act as activators for the blowing agent. The amount of activator added will depend on the choice of blowing agent and the amount of expansion required.

Flame retardants may also be present, of such kinds and at such concentrations as will provide flame retardancy for the article. These may include halogenated flame retardants such as the polybrominated aromatics (e.g. decabromobiphenyl), and the like, for example in combination with inorganic materials such as antimony trioxide; or may include non-halogenated flame retardants, such as the magnesium hydroxide and alumina trihydrate previously mentioned as fillers.

The chemical crosslinking agent is preferably a free radical crosslinking agent compatible with the base polymer of the article. Preferred chemical crosslinking agents are peroxides, such as bis(t-butylperoxy)diisopropylbenzene, 1,1-di-t-butylperoxy-3,3,5-trimethylcyclohexane, 4,4-di-t-butylperoxy n-butyl valerate (Trigonox), dicumyl peroxide (Dicup), and the like. In most cases, the chemical crosslinking agent is provided at 1 to 5 parts per 100 parts of base polymer.

The blowing agent and the chemical crosslinking agent will be chosen so that the chemical crosslinking agent has an activation temperature approximately that of the blowing agent. For example, it may have an activation temperature slightly below that of the blowing agent, so that the foam maintains stability during expansion,; but desirably the kinetics of the crosslinking and foaming reactions are such that the sealer of the article expands and foams on heating, and adheres and seals to the substrates and the bounded opening, before the resulting foam is completely crosslinked by action of the chemical crosslinking agent. Desirably, the activation temperature of the blowing agent will be chosen so that the blowing agent is not easily accidentally activated but is only activated when it encounters temperatures in which it is desired that the sealing article should activate.

The radiation crosslinking promoter may be chosen from among those conventionally used to promote the crosslinking of polymers, such as triallyl cyanurate (TAC), triallyl isocyanurate (TAIC), triallyl trimellitate, triallyl trimesate, tetraallyl pyromellitate, the diallyl ester of 1,1,3-trimethyl-5-carboxy-3-(4-carboxyphenyl)indane, trimethylolpropane trimellitate (TMPTM, Sartomer 350), pentaerythritol trimethacrylate, tri(2-acryloxyethyl) isocyanurate, tri(2-methacryloxyethyl) trimellitate, and the like, and combinations thereof.

The tackifier, if present, will be chosen to enhance the tackiness of the sealer of the article on activation but not such that the article exhibits tackiness after formation of the article and before activation, since it is generally desirable that the outer surface of the article should be dry and non-tacky during initial placement of the article. Desirably, to enhance the adhesive and sealing qualities of the base polymer at the temperature of expansion, the tackifier will have a relatively low molecular weight, no significant crystallinity, a ring-and-ball softening point above at least 50° C. (and preferably higher, near the softening point of the base polymer), and will be compatible with the base polymer and other polymers present. The tackifier may be present in up to 30 parts per 100 parts of base polymer. Suitable tackifiers include novolak resins, partially polymerized rosins, tall oil rosin esters, low molecular weight aromatic thermoplastic resins, Picco® and Piccotac® resins from Hercules Chemical, and the like.

Antioxidants, adhesion promoters, plasticizers, pigments, and the like may also be employed in conventional amounts.

Exemplary formulations include:

| Ingredient | Formulation, parts by weight | | | |
| --- | --- | --- | --- | --- |
|  | A | B | C | D |
| Evatane 28-05 (EVA) |  | 100 |  | 100 |
| Elvax 470 (EVA) | 100 |  | 100 |  |
| Irganox 1076 (antioxidant) | 2 | 2 | 2 | 2 |
| Kadox 911 (ZnO) | 30 | 30 |  |  |
| Huberbrite 7 (BaSO₄) |  |  | 30 | 30 |
| Piccotac 95 (tackifier) |  |  |  | 30 |
| Varox 231 XL (chemical crosslinking agent) | 2.5 | 1.5 | 2.5 | 1.5 |
| Celogen TSH (blowing agent) |  | 10 |  | 10 |
| Celogen OT (blowing agent) | 10 |  | 10 |  |
| Sartomer 350 (radiation crosslinking promoter) | 5 | 5 | 5 | 5 |

Of these formulations, formulations A and C are particularly applicable to the manufacture of the sealer portion of a sealing article of this invention, while formulations B and D are applicable to the manufacture of both the driver and sealer portions of a sealing article.

The composition may be prepared by methods conventional in the art of polymer blending, such as by mixing in a high shear mixer such as a Banbury or Brabender type mixer, with care being taken to ensure that the temperature of the blend does not rise to such an extent that the chemical crosslinking agent or blowing agent are activated. Typically, the base polymer, other polymers/tackifier (if present), and antioxidant are added first, and blended to homogeneity. The filler, adhesion promoter, pigments (if present) may be mixed with the base polymer, or may be added after the base polymer has been softened by mixing. These first mixing stages are not particularly temperature-sensitive. Once all ingredients other than the blowing and crosslinking agents have been added and fully blended, however, temperature control becomes important as these last agents are added. Accordingly, the mixer is cooled so that the temperature of the composition does not exceed about 95° C., and more preferably does not exceed about 80° C.; the blowing agent(s), accelerator(s), crosslinking agents, and any plasticizers are added, and the resulting composition is subjected to high shear mixing under controlled temperature conditions until the composition is homogeneous. The composition may then be cooled, for example by processing through a two-roll mill with cooled rollers.

The resulting bulk composition may then be formed into the appropriate shape for the sealing article of this invention by any appropriate means. For example, it may be extruded or rolled into sheets for cutting, extruded into rods of a desired cross-sectional configuration, molded into desired shapes, or pelletized for later molding or extrusion.

As discussed later with regard to the use of the sealing article of this invention, the materials of the sealing article will desirably chosen so that the sealing article may be activated at as low a temperature is possible consistent with its intended use, so that thermal damage to the substrates or to the bounded opening on activation of the sealing article is minimized.

The particular composition used to make the sealing article of this invention is not critical; and a person of ordinary skill in the art should have no difficulty, having regard to that skill and this disclosure, including the references cited here, in determining a suitable formulation to prepare a sealing article of this invention or in optimizing such a composition for a particular application.

Manufacture of the sealing article

Although it is within the contemplation of this invention that a single sealing article of this invention may have expansion and sealing properties so that it may be used to seal a range of substrates and bounded openings of different sizes or shapes, more typically a sealing article is formulated and shaped specifically for use with particular substrates and in a particular bounded opening which is intended to be sealed. This is especially true where the quality of the seal is of considerable importance to ensure complete sealing of the substrates within the bounded opening.

The sealing article of this invention, as previously described, comprises a crosslinked driver surrounded by an uncrosslinked sealer, the shape and size of which will be chosen based on the substrates, the bounded opening, and the foaming properties of the article. Because the filling of the bounded opening is provided primarily by the driver portion of the article, especially if the bounded opening is non-shrinking, rather than by the sealer portion, which is much softer at the temperature of foaming, the cross-section of the driver portion of the article will desirably be chosen so that, on expansion, the driver portion alone would substantially but not completely fill the space between the substrates and the bounded opening. Too small a driver may provide insufficient filling of the bounded opening for the softer sealer portion to fill the remaining space and form a seal to the substrates and the bounded opening, while too large a driver may buckle within the cavity when fully expanded thereby potentially damaging the seal. The sealer portion of the article will relatively uniformly surround the driver portion in the plane of the article and be of such a size that it provides sufficient sealing, i.e. as yet uncrosslinked, foam during expansion to completely fill all spaces between the driver, the substrates, and the bounded opening and, desirably, adhere to them. The optimal size of the sealer portion will therefore depend on such factors as the volume expansion of the material of the sealer, its extent of expansion, the extent to which the expanded driver portion will fill the bounded opening, the size of the substrates, and the like. The resulting article will therefore typically have a shape that is comparable in shape to the bounded opening to be sealed, but between about 50% and 90% of the linear dimensions, typically about 65% to 80% of the linear dimensions, of the bounded opening; and the driver portion of the article will typically have a minimum dimension, i.e. a dimension that does not include any teeth or other protrusions, of between 35% and 65%, especially about 50%, of the corresponding dimension of the article. If the bounded opening is provided by a heat-shrinkable sleeve, grommet, or the like, the size of the article will typically be chosen based on the need for filling and sealing of the resulting shrunk dimension of the sleeve, etc.; though it will be recognized that the sealing article may be made larger than the final desired size of the activated article if the article is to be activated within a heat-shrinkable sleeve, grommet, or the like that exerts a sufficient force on shrinking that it is capable not only of resisting expansion of the activated sealing article but also of compressing it to a smaller size.

In a preferred embodiment, the cavity sealing article is manufactured in the form of a flat sheet having a shape corresponding generally to the shape of the bounded opening, but smaller in linear dimension. In such a case, it is particularly convenient to manufacture the article from a foamable polymer composition containing both a chemical crosslinking agent for the sealer and a radiation crosslinking promoter for the driver portions of the article, as previously described. A sheet of foamable polymeric material is simply cut to the final dimensions of the article, or the article is molded to the desired shape from the foamable polymeric material, and the driver portion is selectively crosslinked by masking that portion of the piece which will become the sealer of the article, so that only that portion of the piece that will become the driver of the article is crosslinked. The sealer portion and driver portion of the article may also be cut separately from the same or different sheets of foamable polymeric material, and the resulting driver and sealer assembled into the sealing article of this invention. In this case, the sheet from which the driver is cut may be crosslinked as a sheet before the driver is cut from it, or the driver may be crosslinked after cutting from the sheet. Other methods of manufacturing the sealing article are also possible, such as extruding a rod of the foamable polymeric material of the driver to a cross-section desired for the driver, crosslinking it, subsequently extruding around that rod the foamable polymeric material of the sealer, then sectioning the resulting composite rod into a plurality of sealing articles; coextruding the driver and sealer in the appropriate shapes, sectioning, and crosslinking the driver; molding the driver and sealer either as a unitary piece of the same material or comolding two different materials for the driver and sealer, etc. It is also within the scope of this invention that the sealer or an adhesive may also surround the driver in the direction perpendicular to the plane of the article as well as in the plane of the article, and such embodiments are shown in FIGS. 8 and 9. When an additional sealer layer 34 is used, as in FIG. 8, it will typically be the same as the sealer 24, but it may be different and chosen, for example, for a high degree of expansion to provide a "potting" effect around the substrates. When an adhesive layer or layers 36 are used, as shown in FIG. 9, these layer(s) may be hot melt adhesives or mastics, preferably having softening points comparable to the activation temperature of the article, or thermosetting adhesives having an activation temperature somewhat above the activation temperature of the article, such as are well known to persons of ordinary skill in the art. These additional sealer or adhesive layers may be filled with any of the fillers discussed above with respect to the driver and sealer of the sealing article of this invention, as desired for the intended use.

The apertures may be opened in the sealer portion of the article by any suitable method, such as by molding the article into a desired shape including the apertures, or more typically by punching through the sealer with hollow punches to create apertures of the desired size; and slots or slits may be cut through from the periphery of the article to the apertures by any suitable method. The size of the apertures and the width of the slots will typically be chosen for the intended use of the article, so that they will be sized to the substrates to pass therethrough; but if the sealer material is sufficiently soft and/or the substrates sufficiently small, the apertures and slots may be no more than simple holes or slits to ensure a tight fit of the sealer of the article around the substrates before activation of the article, for simplicity of handling, etc. Because of the foaming properties of the driver and the sealer, it is a feature of the sealing article of this invention that the apertures and slots need not be sized accurately to the substrates to be sealed.

The opening of the apertures in the sealer portion of the article and the assembly of the sealer and driver portions of the article or the preparation of the driver portion of the article by selective crosslinking may be performed in either order. If the driver portion of the article is to be a simple central disc, as shown in FIGS. 1 through 3, the order is immaterial; however, if the driver portion of the article is shaped such that it lies between the apertures, as shown in FIGS. 4 through 7, and the driver portion of the article is to be prepared by selective crosslinking of the material of the article, then it may be more convenient for the apertures to be opened in the sealer first and the article oriented for the selective crosslinking step by use of the apertures.

A person of ordinary skill in the art will be able, having regard to that skill and this disclosure, to select suitable materials and perform a suitable method of manufacture for a sealing article of this invention.

Use of the sealing article

The sealing article of this invention is used by placement of the substrates through the apertures in the article and placement of the article in the bounded opening so that the substrates pass through the bounded opening, followed by activation of the article to form the seal between the substrates and the bounded opening. The article may be emplaced within the bounded opening either before or after placement of the substrates through the apertures in the article; and more commonly it will be emplaced within the bounded opening after placement of the substrates through the apertures in the article.

Because the driver portion of the sealing article of this invention is crosslinked, it does not melt or flow when heated to a temperature above the melting point of the polymers comprising it, although it will soften to a certain extent, depending on the materials, the extent of crosslinking, and the temperature. It is therefore a particular benefit of the sealing article of this invention that the driver portion is relatively stable, albeit expandable, and the article can therefore be emplaced within the bounded opening without further support. What is more, because the driver foams and expands in use, it is not necessary that any mounting of the sealing article within the bounded opening, if desired or required, be a sealed mounting, as the article will expand to seal tightly to any mounting means that is used. As a result, the sealing article of this invention does not need expensive, complex, or precise mounting within the bounded opening to be sealed, but yet will still provide an excellent seal when used.

Sealing article of this invention are therefore expected to find particular application in automobiles and other vehicles, in marine applications, in aerospace applications, and in telecommunications applications. Suitable substrates to be sealed by the sealing article include electrical conductors, both insulated and uninsulated, since the sealing article may provide insulation for exposed conductors if desired, carrying both electronic signals and electrical power, optical fibers and fiber optic cables, and the like. If it is desired to provide a seal to a bounded opening but yet permit the passage of electrical conductors, optical fibers and the like after formation of the seal, the substrates may include hollow tubes, especially of a material remaining rigid at the activation temperature of the sealing article, so that one large bounded opening may be closed leaving open one or more smaller openings through which conductors, optical fibers, etc. may pass and into which they may more easily and securely be sealed. The bounded openings that may be sealed by the sealing article of this invention include tubes, pass-throughs, connector shells, heat-shrinkable sleeves, openings in telecommunication pedestals, terminal blocks, and the like, and apertures in firewalls, junction boxes, and other housings, etc. A particular application of the sealing article of this invention is to seal substrates into a grommet, especially into a heat-shrinkable grommet, so that the grommet may later be installed through an opening in a firewall, junction box, and the like.

When it is desired to activate the sealing article of this invention, the article is exposed to a sufficient temperature for a sufficient time to activate the blowing agent and the chemical crosslinking agent. Suitable times and temperatures will depend on the application in which the sealing article is to be used, and may include temperatures between 60° C. and 350° C. for periods between a few seconds and an hour or more. Typically, in the case of sealing electrical conductors to a connector, this activation will occur by heating with a hot air gun or torch, and such temperatures and times are typically between 60° C. and 200° C. for 1 to 60 minutes, for example 100° C. for 10 minutes, but a person of ordinary skill in the art will realize that other temperatures and times may be appropriate. Desirably, the activation temperature used will be as low as possible so that the substrates are not damaged by exposure to the activation conditions, e.g. so that the insulation of insulated electrical conductors, which may be poly(vinyl chloride) or polyethylene having a relatively low melting point, is not melted or damaged. On heating and activation, the uncrosslinked sealer portion of the article softens and foams while the crosslinked driver portion of the article foams in a uniform fashion to push the sealer into intimate sealing contact with substrates and the bounded opening. The foam of the sealer portion then chemically crosslinks, stabilizing the sealer foam so that the article forms a stable plug filling the whole cross-section of the bounded opening and sealing to the substrates and to the bounded opening, acting as a barrier against intrusion of fluids, sound, particulates, and/or electromagnetic interference.

The invention is illustrated by the following Examples.

EXAMPLE 1

A foamable sheet was prepared from the following formulation:

| Ingredient | Parts by weight |
| --- | --- |
| Evatane 28-05 (EVA, 28% VA, MFI 5, Atochem) | 100.0 |
| Irganox 1076 (antioxidant, Ciba-Geigy) | 2.0 |
| Kadox 911 (zinc oxide) | 30.0 |
| Varox 231 XL (peroxide crosslinker, Vanderbilt) | 1.5 |
| Celogen TSH (blowing agent, Uniroyal) | 10.0 |
| Sartomer 350 (radiation crosslinking promoter, Sartomer) | 5.0 |
| Raven C Ultra Beads (carbon black) | 2.0 |

A Brabender mixer was set at 80° C.; and the Evatane, Irganox, and Kadox were added and blended to homogeneity. The Varox, Celogen, and Sartomer were then added and blended to homogeneity, ensuring that the temperature of the mixer remained below 80° C. during the mixing process. The mixed material was then molded, at about 100° C. (below the decomposition temperature of the Varox and Celogen), into a sheet of approximately 6 mm thickness.

A circular sealing article having a diameter of 24 mm was prepared from this sheet, and a coaxial central portion 12 mm in diameter was irradiated with 3.2 Mrad of 3.0 MeV electrons to produce the driver portion of the article. Six equally spaced apertures of 2 mm diameter were punched through the uncrosslinked sealer portion of the article, and a 2 mm outer diameter insulated electrical conductor placed through each aperture. A 33 mm diameter heat-shrinkable polyethylene sleeve approximately 10 cm long was placed over the sealing article so that the article lay approximately at the mid-point of the sleeve; and the resulting assembly was placed in a 157° C. oven for 25 minutes. The heat-shrinkable sleeve shrank around the sealing article, and the article formed an environmental seal between the conductors and the sleeve.

EXAMPLE 2

A 6 mm thick sheet of foamable polymeric material was prepared as in Example 1. A 25 mm diameter disk was cut from the sheet, masked, and irradiated with 1.6 Mrad of 3.0 MeV electrons to produce a toothed driver having a 12 mm central diameter with sixteen 6 mm long×1 mm wide teeth extending therefrom. Sixteen 2 mm diameter apertures were opened in the uncrosslinked sealer portion of the article, one between each of the teeth of the driver; and a 2 mm outer diameter insulated electrical conductor placed through each aperture. A 33 mm diameter heat-shrinkable sleeve approximately 10 cm long was placed over the sealing article so that the article lay approximately at the mid-point of the sleeve; and the resulting assembly was placed in a 150° C. oven for 25 minutes. The heat-shrinkable sleeve shrank around the sealing article, and the article formed an environmental seal between the conductors and the sleeve. Due to the teeth of the driver, all sixteen conductors were kept well separated and insulated from each other.

EXAMPLE 3

A sealing article was prepared as in Example 2, with sixteen apertures, and with a 2 mm outer diameter insulated electrical conductor placed through each aperture. A copper pass-through fitting of 35 mm inside diameter and approximately 5 cm length was placed over the sealing article so that the article lay approximately at the mid-point of the fitting; and the resulting assembly was placed in a 150° C. oven for 25 minutes. The sealing article foamed and expanded to fill the fitting, and the article formed an environmental seal between the conductors and the fitting. Due to the teeth of the driver, all sixteen conductors were kept well separated and insulated from each other.

EXAMPLE 4

A sealing article is prepared as in Example 2, with six apertures. Six pairs of 2 mm outer diameter insulated electrical conductors are prepared; and the ends of each pair stripped for 7 mm, twisted together, and soldered; thereby preparing six joined conductors with approximately 5 mm of exposed connection at the mid-point of each conductor. These conductors are inserted through the apertures in the sealing article so that each exposed connection lies within the aperture. A copper pass-through fitting of 35 mm inside diameter and approximately 5 cm length is placed over the sealing article so that the article lies approximately at the mid-point of the fitting; and the resulting assembly is placed in a 150° C. oven for 25 minutes. The sealing article foams and expands to fill the fitting, and the article forms an environmental seal between the conductors and the fitting. Due to the teeth of the driver and the sealer, all six conductors are kept well separated and insulated from each other and from the fitting.

While this invention has been described in conjunction with specific embodiments and examples, it will be evident to one of ordinary skill in the art, having regard to this disclosure, that equivalents of the specifically disclosed materials and techniques will also be applicable to this invention; and such equivalents are intended to be included within the following claims.

What is claimed is:

1. A planar sealing article comprising:
   (a) a driver comprising a crosslinked foamable polymer, and
   (b) a sealer comprising an uncrosslinked foamable polymer in intimate contact with the driver and surrounding the driver in the plane of the article, the sealer having a plurality of apertures therethrough.

2. A planar sealing article for forming a seal between a plurality of substrates and a bounded opening through which the plurality of substrates pass, the article comprising:
   (a) a driver comprising a crosslinked foamable polymer, and
   (b) a sealer comprising an uncrosslinked foamable polymer in intimate contact with the driver and surrounding the driver in the plane of the article, the sealer having a plurality of apertures therethrough;
the article having a size and shape such that the article incompletely occupies the bounded opening and having expansion and sealing properties such that, when the article is placed within the bounded opening and the plurality of substrates are placed through the plurality of apertures, and the article is foamed, a seal is formed between the plurality of substrates and the bounded opening.

3. The article of claim 2 where the foamable polymer of the driver and the foamable polymer of the sealer are the same.

4. The article of claim 3 where the foamable polymer of the driver is a radiation crosslinked foamable polymer.

5. The article of claim 4 where the driver and the sealer are formed from a single piece of foamable polymer that has been selectively irradiated to form the driver.

6. The article of claim 2 where the driver and sealer are formed from two separate pieces of foamable polymer.

7. The article of claim 6 where the foamable polymer of the driver is a radiation crosslinked foamable polymer.

8. The article of claim 2 where the article has a thickness between 3 mm and 13 mm.

9. The article of claim 8 where the article has a thickness between 5 mm and 8 mm.

10. The article of claim 2 where the article has a shape corresponding generally to the shape of the bounded opening.

11. The article of claim 10 having dimensions that are between 50% and 90% of the dimensions of the bounded opening.

12. The article of claim 11 having dimensions that are between 65% and 80% of the dimensions of the bounded opening.

13. The article of claim 2 where a line drawn between any two of the plurality of apertures passes through the driver.

14. The article of claim 2 where the article has a periphery in its plane and at least one of the plurality of apertures is connected to the periphery.

* * * * *